3,001,979
PREPARATION OF A UREA-DIALDEHYDE STARCH DERIVATIVE

Peter J. Borchert, Elkhart, Ind., assignor to Miles Laboratories, Inc., Elkhart, Ind., a corporation of Indiana
No Drawing. Filed Oct. 6, 1958, Ser. No. 765,274
4 Claims. (Cl. 260—96.5)

This invention relates to new methods for the manufacture of a urea-dialdehyde starch reaction product. More specifically, this invention pertains to processes of reacting urea with 2,3-dialdehyde starch—also called periodate oxidized starch or, in short, oxystarch—yielding a polymeric composition of matter which may be designated as a "polyglycosylol-urea" compound.

The reaction of oxystarch and urea, which takes place readily and under mild conditions, proceeds, it is believed, in accordance with the following diagrammatic equation:

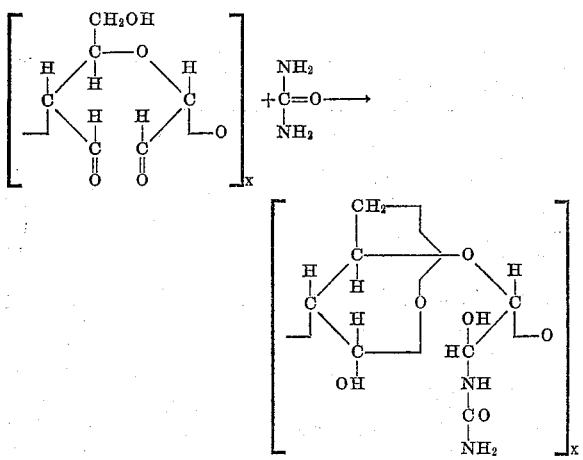

wherein $x$ stands for the number of repeating units in the molecule. These repeating units may number as many as several thousand.

As illustrated by the above graphic formula of the reaction product, it is the fundamental nature of this reaction that only one of the two available carbonyl groups of 2,3-dialdehyde starch reacts with urea by addition, leaving a potential carbonyl group per polymer unit. More specifically, it is the $C^2$ carbonyl group which reacts with a urea molecule due to its greater reactivity, while the $C^3$ carbonyl group may undergo hydration and subsequent formation of a hemiacetal with the primary alcohol group of $C^6$ of the polymer unit. (The carbon positions are numbered in accordance with the system of numbering applied to the ring structure of the parent compound, starch.) The existence of this molecular structure has been postulated by J. W. Sloan et al. in Ind. & Eng. Chem. 48, 1169 (1956). Also, an analogous structure for the reaction product of oxystarch with phenylhydrazine was proved by L. Mester, J. Am. Chem. Soc. 77, 5452 (1955).

It can be expected that a certain percentage of the urea-oxystarch polymer, characterized by methylol fractions, is comprised of the corresponding methylene derivative, especially when elevated temperatures are employed and water is caused to split off.

Periodate oxystarch has been reacted with urea prior to this invention by J. W. Sloan et al., as described in the Sloan reference cited above, but these reactions were carried out with only 2–6% oxystarch concentrations at temperatures of between 40 and 65° C. No reaction was found to occur at room temperature at neutral or slightly acidic pH.

In contrast, the present invention resides in the discovery of a convenient, efficient, and surprisingly straightforward process in accordance with which oxystarch may be reacted with urea in a 20–30% slurry or, after treatment with alkali, in a 40–60% dispersion instead of using 2–6% oxystarch concentrations. (Percentages given are by weight.)

More particularly, it has been found that a slurry of dialdehyde starch in a methanolic medium reacts with exactly one mole of urea per mole of oxystarch polymer unit—urea being dissolved in methanol—both at room temperature in about 16 hours and at elevated temperatures after heating for a period of about 1 hour. The urea adduct obtained in this manner may easily be slidified by direct filtraton in yields of 100% theory in all cases. It is a white powder which has been found to be practically insoluble in water.

Obvious technological advantages of this process are: oxystarch need not be dissolved and may be converted in a slurry at high concentrations; the reaction may be carried out at room temperature; deleterious side reactions such as degradation, etc., are completely absent (100% yields); and the desired product may conveniently be directly filtered. Moreover, the methanol together with the excess of urea dissolved therein may be reused.

The dialdehyde starch used as starting material for the formation of this "polyglycosylol" compound may be prepared by methods known to the art. One of the most common methods for making it is through oxidation of the starch with periodic acid or its salts. The electrolytic procedure taught by U.S. Patent No. 2,713,553 is especially noteworthy for its convenience and economy.

As mentioned above, oxystarch may also be reacted with urea in a 40 to 60% aqueous or aqueous/methanolic dispersion after a short treatment with an alkaline material. The procedure of subjecting oxystarch to alkali for a period not exceeding 5 minutes is disclosed in U.S. Patent No. 2,783,283 as effecting highly concentrated dispersions (content of solids as high as 50%) of oxystarch which otherwise dissolves or disperses in water only to about 2%. However, in the work covered by the patent just alluded to, the alkali-treated oxystarch was apparently not isolated, it being merely an intermediate in the preparation of erythritol and ethylene glycol.

I have now isolated this product through precipitation in methanol and have found that it is completely soluble in water and yet exhibits typical aldehyde reactions, being also capable of undergoing a reaction with urea. In order to effect a minimum loss of dialdehyde polymer units and a minimum of degradation, the alkali treatment has been modified in that the oxidized starch is pretreated with alkali for a period not exceeding 1 minute. Thus, it has been found, that less than 1% of these units is lost in the process, while the short period of 1 minute is yet fully sufficient for dissolving the oxystarch.

The solubility of alkali-pretreated dialdehyde starch as well as of its reaction product with urea is due, it is believed, to the formation of a certain amount of carboxyl groups through a partial internal Cannizzaro reaction. These carboxyl groups form salts with sodium ions, which impart to the oxystarch compound the property of solubility.

As illustrated in greater detail by Examples 3 and 4, in the practice of the process whereby alkali-dispersed oxystarch is reacted with urea, the dialdehye starch is first dissolved by pretreating with diluted sodium hydroxide and then neutralized with acid to a pH of 4 to 5. After the urea is dissolved in this solution, the reaction takes place either at room temperature in 24 hours or in a perod of 1 to 2 hours at 50° C. From these highly concentrated solutions the urea polymer can be obtained in the form of an amorphous powder, by pouring the aqueous solution into methanol or other alcohols such as ethanol, propanol, or alcohol-acetone mixtures. Yields are between 80 to 87% of theory. Compounds thus prepared are, as shown above, completely soluble in cold water.

Other reaction media that may be used within the purview of this invention besides water, methanol and mixtures of water and methanol, are acetone and other lower alcohols or mixtures of a lower alcohol with acetone or water as well as mixtures of water and acetone. The function of these media is to reduce the viscosity of the reaction mixture and thus to facilitate good contact between the reactants.

Because of its unique nature and functionality, the subject compound of this invention has great potentialities for use by itself or after further chemical modification. As urea derivative and polymer, for instance, it has utility in the plastics industry as molding powders, in the textile industry for yielding crease and crush-proof fabrics and in the adhesive industry. It also is useful as intermediate for future synthetic work due to the presence of the second potential carbonyl group as well as other reactive groups in each of the polymer units.

Although this specification has reference solely to methods of reacting oxystarch with urea, it is to be understood that the scope of this invention encompasses reactions of urea with other oxypolysaccharides such as oxycellulose and the like.

The method for the preparation of this compound may be illustrated more specifically by the following examples:

Example I (1) 24 g. oxystarch (content: 16.3 g. pure oxystarch=.101 mole) containing 2.95% water, prepared by heating oxystarch in toluene charged to a flask attached to a Stark and Dean trap and attached to a reflux condenser for 1 hour.
(2) 13.6 g. urea (.226 mole).
(3) 150 ml. methanol.

(1), (2), and (3) were stirred at room temperature over 16 hours. After filtration the white powder was washed with methanol and finally acetone. Yield: 29.5 g. (100% of theory calculated on dry material).

*Analysis.*—Calcd. for a 1.99% moisture-containing urea polymer obtained from a starting material with 70.2% content of 2,3-dialdehyde starch: N, 8.7. Found: N, 9.5.

Example II (1) 24 g. oxystarch (content: 16.3 g. pure oxystarch=.101 mole) containing 2.95% water, prepared by heating oxystarch in toluene charged to a flask attached to a Stark and Dean trap and attached to a reflux condenser for 1 hour.
(2) 26.4 g. urea (.440 mole).
(3) 150 ml. methanol.

(1), (2) and (3) were stirred in a flask with a reflux condenser and heated on a water bath for 1 hour at 70° C. After cooling, the white powder was filtered, washed with MeOH and finally acetone. Yield: 30 g. (100% of theory).

*Analysis.*—Calcd. for a 4.0% moisture-containing urea polymer obtained from a sarting material with 70.2% content of oxystarch. N, 8.6. Found: N, 9.1.

Example III (1) 40 g. oxystarch (content 26 g. pure oxystarch=.162 mole).
(2) 40 ml. n/10 sodium hydroxide.
(3) 1 ml. glacial acetic acid.
(4) 20 g. urea (.333 mole).
(5) 10 ml. methanol.

(1) and (2) in a beaker were vigorously stirred and heated. The initial slurry thickened at 40° C. in a few seconds and becaue a moist, lumpy solid. With continued stirring and warming at 50° C. for 1 minute, the mass glazed, softened and formed a yellow solution. Then (3) was immediately added to reduce the pH to 4–5 and the solution was cooled to room temperature using an ice bath. Then (4) was stirred into the mixture after solution of the urea and (5) to reduce the viscosity. After 24 hours standing at room temperature, the clear solution was worked up by adding 100 ml. acetone. The white, syrupy oil was isolated and dissolved in 60 ml. water/MeOH (1:1) and neutralized with sodium carbonate solution, then poured under stiring into 1,000 ml. methanol. The white powder was filtered, washed with methanol and finally with acetone. Yield: 33 g. (86%

*Analysis.*—Calcd. for a 6.4% moisture-containing urea polymer obtained from a starting material with 75.6% content of oxystarch. N, 8.95. Found: 9.0.

Example IV (1) 40 g. oxystarch (content: 34 g. pure oxystarch=.210 mole).
(2) 60 ml. n/10 sodium hydroxide.
(3) 25.2 g. urea (.420 mole).
(4) 5 ml. glacial acetic acid.

(1) was dissolved in (2) as described in Example III. After acidification with (4), (3) was caried into the mixture which was then heated at 50° C. for 2 hours. The methylol compound was isolated as demonstrated in Example III. Yield: 43.5 g. (87% of theory).

*Analysis.*—Calcd. for an 11.1% moisture-containing urea polymer obtained from a starting material with 91.2% content of oxystarch). N, 10.3. Found: 11.1.

In summary, the instant invention pertains to new methods for the preparation of a useful urea-oxystarch polymer by reacting urea with 2,3-dialdehyde starch or alkali-dispersed 2,3-dialdehyde starch in the presence of a suitable reaction medium at a temperature of from 70° C. to room temperature for from 1 to 24 hours. The desired product can be isolated by either direct filtration or by precipitation with methanol.

What is claimed is:

1. A process for the preparation of a urea-dialdehyde starch compound which comprises reacting in slurry a concentration of about from 20% to 30% of dialdehyde starch with urea, in the presence of a medium selected from the group consisting of acetone and lower alcohols wherein said urea is dissolved and said dialdehyde starch is slurried, at a pH of about 4 to 5 and a temperature of about from 70° C. to room temperature for about from 1 to 24 hours, and recovering the urea-dialdehyde starch product thereby obtained.

2. A process according to claim 1 wherein the reactants are in the proportion of 1 mole of urea per mole of dialdehyde starch polymer unit.

3. A process according to claim 1 wherein said reaction is carried out at room temperature in about from 16 to 24 hours.

4. A process according to claim 1 wherein said reaction is carried out at about from 50° C. to 70° C. in from about 1 to 2 hours.

References Cited in the file of this patent

UNITED STATES PATENTS 2,634,261    Fetterly               Apr. 7, 1933

OTHER REFERENCES

Sloan et al.: "Ind. and Chem. Eng.," vol. 48, pp. 1165–72, July 1956.